UNITED STATES PATENT OFFICE 1,932,901

PROCESS FOR DYEING FURS, HAIRS, OR FEATHERS

Erich Lehmann, Wolfen, Kreis Bitterfeld, Germany, assignor to General Aniline Works, Inc., New York, N. Y., a corporation of Delaware No Drawing. Application April 14, 1931, Serial No. 530,148, and in Germany August 1, 1930

8 Claims. (Cl. 8—5)

My invention relates to a new process for dyeing furs, hairs and feathers.

I have found that for dyeing furs, hairs and feathers in the presence of an oxidizing agent there are suitable compounds obtainable by condensing polyhydric alcohols or alcohol halides with compounds of the benzene series containing, if required, besides any other substituent at least one primary amino group. When dyeing in a neutral, alkaline or acid bath the very easily soluble compounds yield on mordanted or non-mordanted material grey to dark-brown tints, which could hitherto only be produced by mixtures of compounds yielding different tints.

The compound of the benzene series forming one constituent of the condensation product, may be selected from the group comprising, for instance:—4-amino-1-ethoxybenzene, 2-amino-1-methoxybenzene, 1.4-diamino benzene, 1-amino-4-dimethylamino benzene, 1-methoxy-2.4-diamino benzene, 1-methoxy-2.5-diamino benzene, 1-methyl-2.5-diamino benzene, 1.2-diamino benzene, 1.2-diamino-4-chlorobenzene and similar compounds of the benzene series containing at least one primary amino group. It is obvious that other monoamines or diamines of the benzene series which may contain other substituents such as, for instance, the nitro group, may likewise be used; in the case of diamines one amino group may be substituted.

The other constituent of the condensation product may be a polyhydric alcohol or a halogen substitution product thereof, such as, for instance:— 1-hydroxy-2-chloro-ethane, 1.2-dihydroxy-3-chloropropane, 1.3-dihydroxy-2-chloropropane, 1-hydroxy-2-chloropropane and so forth.

The condensation of one of the amino compounds of the benzene series mentioned above, with a polyhydric alcohol, may be carried out in the presence of a condensing agent such as hydrogen chloride, sulfuric acid, zinc chloride, anhydrous calcium chloride and so forth, in the presence of a suitable solvent. Halogen substitution products of the polyhydric alcohols are reacted on the diamines in a suitable solvent and in the presence of an acid binding agent, such as alkali metal hydroxides, calcium oxide, magnesium oxide and so forth. Generally, molecular proportions of the starting materials are condensed in this manner.

The condensation products obtained are partially well-known in the art. Generally, they are easily soluble in water and easily oxidized. The final condensation products constitute amines substituted in the amino group by aliphatic alcohol radicals, thus, the condensation product of, for instance, 1.4-diamino-benzene and 1.2 dihydroxy-3-chloropropane probably is an 1-(2'3'-dihydroxypropylamino)-4-aminobenzene corresponding to the formula:

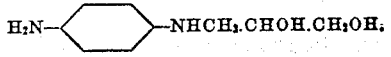

The same end products are obtained when reacting either with a halogenated alcohol (for instance, 1-hydroxy-2-chloro-ethane) or with the corresponding polyhydric alcohol (glycol) on the said amines; in the first case hydrohalogen acid and in the other case $H_2O$ is split off during condensation and in each case my dyeing agents are characterized by an amino group substituted by an alcoholic radical.

The following examples serve to illustrate the invention, but they are not intended to limit it thereto.

*Example 1.*—White rabbit skin mordanted with a chromium salt, is treated with an aqueous solution, one liter of which contains 3 grams of the condensation product from 4-amino-1-ethoxy-benzene and 1.2-dihydroxy-3-chloropropane and 30 cc. of a 3% hydrogen superoxide solution. The skin is dyed a clear greyish-brown tint.

*Example 2.*—White rabbit skin is treated with an aqueous solution, one liter of which contains 3 grams of the condensation product from 1.4-diaminobenzene and 1.2-dihydroxy-3-chloropropane and 30 cc. of a 3% hydrogen superoxide solution. A non-mordanted skin is dyed a dull wine-red, skin mordanted with iron salts a bluish-brown tint.

*Example 3.*—A skin mordanted with chromium salts is treated with an aqueous solution, one liter of which contains 3 grams of the condensation product from 2-amino-1-methoxybenzene and 1-hydroxy-2-chloro-ethane and 30 cc. of a 3% hydrogen superoxide solution. The skin is dyed a brown-grey tint.

*Example 4.*—A skin mordanted with a copper salt is treated with an aqueous solution, one liter of which contains 3 grams of the condensation product from 1-amino-4-dimethylaminobenzene and 1.3-dihydroxy-2-chloro-propane and 30 cc. of a 3% hydrogen superoxide solution. The skin is dyed a greenish-grey-black tint.

In the table following hereafter, other condensation products are enumerated which, when applied in the manner described in the examples, yield likewise valuable tints on mordanted or unmordanted skins:—

| Condensation product of | Mordant | Tint |
|---|---|---|
| 1 - methoxy - 2,4 - diaminobenzene +1,2-di-hydroxy-3-chloropropane. | | Grey. |
| 1 - methoxy - 2,5 - diaminobenzene +1,2-di-hydroxy-3-chloropropane. | Iron. | Greenish-grey. |
| 1-methyl-2,5-diaminobenzene+1,2-di-hydroxy-3-chloropropane. | Aluminous. | Light grey. |
| 1,2-diaminobenzene+1,2-di-hydroxy-3-chloropropane. | Chrome. | Yellow-brown. |
| 1,2 - diamino - 4 - chlorobenzene+1,2-di-hydroxy-3-chloropropane. | Copper. | Yellow. |

What I claim is:—

1. The process which comprises dyeing furs, hairs or feathers by treating the said material in a bath containing an oxidizing agent and a benzene compound containing as substituent an amino group substituted by an aliphatic alcohol.

2. The process which comprises dyeing furs, hairs or feathers by treating the said material in a bath containing an oxidizing agent and a compound of the general formula

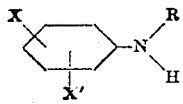

R meaning the radicle of a mono- or polyhydric aliphatic alcohol, X and X' meaning H, alkyl, O·alkyl, $NH_2$,

halogen or nitro, at least one of these substituents being a radicle other than H.

3. The process which comprises dyeing furs, hairs or feathers by treating the said material in a bath containing an oxidizing agent and a compound of the general formula

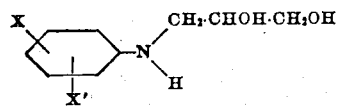

X and X' meaning H, alkyl, O·alkyl, $NH_2$,

halogen or nitro, at least one of these substituents being a radicle other than H.

4. The process which comprises dyeing furs, hairs or feathers by treating the said material in a bath containing an oxidizing agent and a compound of the general formula

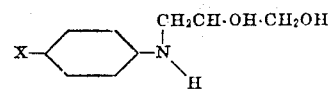

X meaning O·alkyl, $NH_2$ or

5. The process which comprises dyeing furs, hairs, or feathers by treating the said material in a bath containing an oxidizing agent and a compound of the general formula

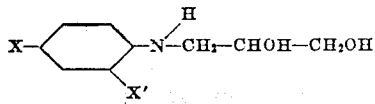

X and X' meaning H, $NH_2$, $OCH_3$, $CH_3$, Cl, one of these substituents being an amino group, the other being a radicle other than amino.

6. The process which comprises dyeing furs, hairs, or feathers by treating the said material in a bath containing an oxidizing agent and the condensation product of 1-methoxy-2,5-diaminobenzene with 1,2-di-hydroxy-3-chloropropane.

7. The process which comprises dyeing furs, hairs, or feathers by treating the said material in a bath containing an oxidizing agent and the condensation product of 1-methyl-2,5-diaminobenzene with 1,2-di-hydroxy-3-chloropropane.

8. The process which comprises dyeing furs, hairs or feathers by treating the said material in a bath containing an oxidizing agent and a compound of the general formula

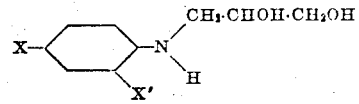

X and X' meaning H, alkyl, O·alkyl, $NH_2$ or

at least one of these substituents being a radicle other than hydrogen.

ERICH LEHMANN.